United States Patent
Matsuda

[11] Patent Number: 5,907,442
[45] Date of Patent: May 25, 1999

[54] REFLECTIVE OPTICAL SYSTEM

[75] Inventor: Toru Matsuda, Tokyo, Japan

[73] Assignee: Canon Kabushiki Kaisha, Tokyo, Japan

[21] Appl. No.: 08/785,217

[22] Filed: Jan. 17, 1997

Related U.S. Application Data

[63] Continuation of application No. 08/296,161, Aug. 29, 1994, abandoned.

[30]     Foreign Application Priority Data

Sep. 10, 1993    [JP]    Japan ................................. 5-249983

[51] Int. Cl.$^6$ ............................. G02B 5/08; G02B 7/182; G02B 5/10; G02B 17/00
[52] U.S. Cl. ......................... 359/858; 359/850; 359/851; 359/853; 359/864; 359/859; 359/861; 359/727; 359/728; 359/730; 359/731
[58] Field of Search ..................................... 359/858, 850, 359/851, 853, 864, 857, 364, 365, 727, 728, 729, 730, 731, 859, 861

[56]          References Cited

U.S. PATENT DOCUMENTS

| | | | |
|---|---|---|---|
| 3,963,328 | 6/1976 | Abel et al. ............................... | 359/859 |
| 4,576,452 | 3/1986 | Abel et al. ............................... | 359/858 |
| 4,927,256 | 5/1990 | Lacuve .................... | 359/858 |
| 5,274,498 | 12/1993 | Rios-Rivera et al. .................. | 359/858 |
| 5,287,218 | 2/1994 | Chen ....................................... | 359/858 |

OTHER PUBLICATIONS

Daniel J. Schroeder, "All-Reflecting Baker-Schmidt Flat-Field Telescopes", Applied Optics, Fourier Transforms of Cervical Cells, pp. 141–144, vol. 17, No. 1, Jan. 1, 1978.

*Primary Examiner*—Cassandra Spyrou
*Assistant Examiner*—Mohammad Y. Sikder
*Attorney, Agent, or Firm*—Fitzpatrick, Cella, Harper & Scinto

[57]          ABSTRACT

A reflective optical system includes, in traveling order of light, a correction plate having an aspherical surface and a reflecting mirror for concentrating the light. An image is formed out of an optical path between the correction plate and the reflecting mirror.

10 Claims, 3 Drawing Sheets

LATERAL ABERRATION VIEW

REFLECTIVE OPTICAL SYSTEM

This application is a continuation of application Ser. No. 08/296,161 filed Aug. 29, 1994, now abandoned.

BACKGROUND OF THE INVENTION

1. Field of the Invention

The present invention relates to a reflective optical system, and more particularly, to a reflective optical system which is suited to image an object on the ground or in the sky onto an imaging plane by using light with a wide wavelength range from ultraviolet to infrared and which has a F-number of 2 to 4 and a field angle of coverage of approximately 3° to 4°.

2. Description of the Related Art

Reflective optical systems have been frequently used as a high-performance imaging apparatus for imaging a target (object) on the ground or in the sky. In such systems, a Schmidt camera can easily attain relatively high optical performance.

The Schmidt camera is provided with an optical system in which the center of curvature of a concave spherical mirror (main mirror) functions as a diaphragm position and an aspherical correction plate for correcting spherical aberration is disposed near the center of curvature. This structure substantially eliminates off-axial coma and astigmatism and offers relatively high optical performance for a ray having a wide field angle.

There are problems in the Schmidt camera that an image plane in an effective ray bundle curves in a spherical shape, and that chromatic aberration is caused by the aspherical correction plate. Particularly, when the Schmidt camera is used in a wide wavelength range from ultraviolet to infrared, more chromatic aberration owing to the aspherical correction plate arises. Therefore, it is required that the whole optical system be constituted by only reflecting mirrors.

A reflective optical system using a reflecting correction plate instead of the refractive correction plate of the Schmidt camera is suggested in, for example, U.S. Pat. No. 4,576,452.

FIG. 6 is a schematic view of the optical system in a Schmidt camera suggested in the above patent which uses an aspherical reflecting correction plate. Referring to the figure, a ray bundle from an object is reflected by an aspherical correction plate 61, and reflected and concentrated by a spherical mirror (main mirror) 62, thereby forming an image of the object on an imaging plane 63.

In addition, *Applied Optics*, No. 17,141 and others suggest a reflective optical system which folds a ray bundle from a main mirror by a convex mirror in the opposite direction to let an imaging plane out of an effective ray bundle.

The former reflective optical system suggested in U.S. Pat. No. 4,576,452 has a problem that the aspherical correction plate made of an off-axis mirror is hard to produce since the surface thereof is rotationally asymmetrical.

On the other hand, in the latter reflective optical system suggested in *Applied Optics*, the effective aperture of the convex mirror is large, and a substantial F-number is large since the effective ray bundle is blocked by the convex mirror.

SUMMARY OF THE INVENTION

An object of the present invention is to provide a reflective optical system having high optical performance all over a picture plane which can be used in a wide wavelength range from ultraviolet to infrared and is excellent in off-axial optical performance and in which an imaging plane does not block an effective ray bundle.

Another object of the present invention is to simplify the production of a reflecting mirror and a correction plate.

In a reflective optical system of the present invention, when a ray bundle from an object is reflected and concentrated by a concave reflecting mirror through an aspherical correction plate and guided onto an imaging plane to form an image of the object, optical axes of the reflecting mirror and the aspherical correction plate are positioned on the same straight line away from the center of the imaging plane.

More specifically, the aspherical correction plate is made of a reflecting member, or zinc sulfide is used as a material of tranmitting correction plate.

DESCRIPTION OF THE PREFERRED EMBODIMENTS

Embodiments of the present invention will now be described with reference to the drawings.

Figure 1:
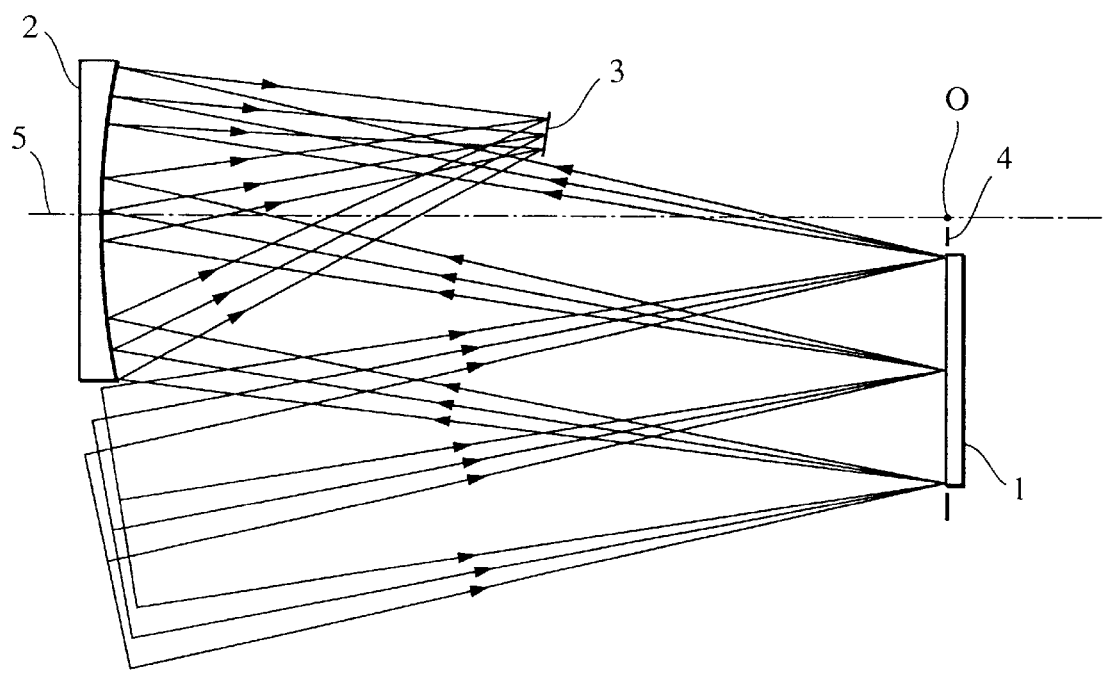
FIG. 1 is a schematic view showing the principal part of an optical system according to a first embodiment of the present invention.
Figure 2:
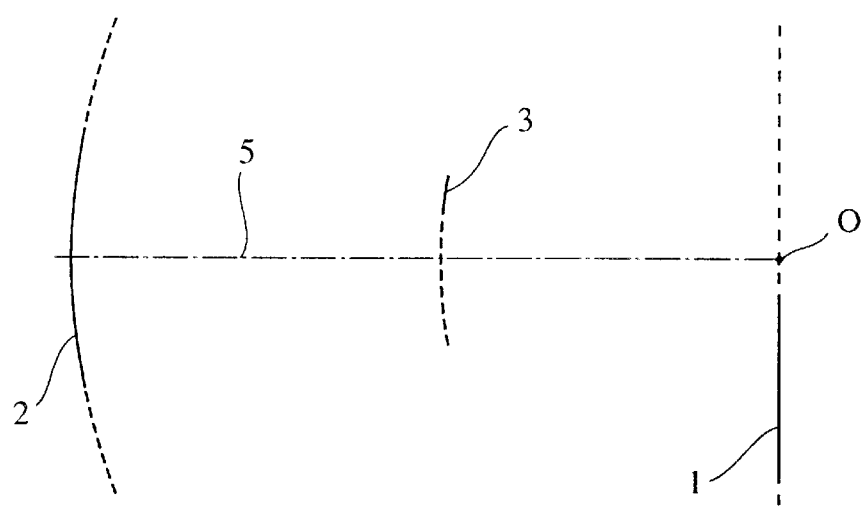
FIG. 2 is an explanatory view showing the optical arrangement of components in FIG. 1.

FIG. 1 is a schematic view showing the principal part of an optical system according to a first embodiment of the present invention, and FIG. 2 is an explanatory view showing the use area of components in FIG. 1.

Referring to the figures, a reflecting correction plate 1 provided with an aspherical surface has little refractive power and reflects a ray bundle from an object (not shown). A main mirror 2 is a concave mirror, and forms an image of the object onto an imaging plane 3 (photoconductive plane) located out of an effective ray bundle and curved in a spherical shape by reflecting and concentrating the ray bundle from the aspherical reflecting correction plate 1 disposed near the center O of curvature thereof. Numerals 4 and 5 respectively denote an aperture stop located in a flat plane passing near the center O of curvature of the main mirror 2, and the optical axis of the main mirror 2 and the aspherical reflecting correction plate 1.

As shown in FIG. 2, this embodiment has such an arrangement as to agree the optical axes of the aspherical reflecting correction plate 1 and the main mirror 2 on the optical axis 5. The optical axis of the spherical surface of the imaging plane 3 also agrees with the optical axis 5. Areas indicated by solid lines in FIG. 2 are used as effective areas, and other areas, which are not used, are cut off, thereby achieving an optical system shown in FIG. 1.

In this embodiment, astigmatism and coma of the off-axial ray bundle are minimized by locating the aperture stop 4 near the center O of curvature of the main mirror 2. Furthermore, spherical aberration resulting from the spherical shape of the main mirror 2 is canceled by the aspherical reflecting correction plate 1.

The imaging plane 3 is curved in the spherical shape in this embodiment as in a common Schmidt camera. Furthermore, the whole optical system is constituted only by reflecting mirrors, thereby avoiding variations in aberration owing to the difference in wavelength, and obtaining uniform optical performance in a wide wavelength range from ultraviolet to infrared.

The reflective optical system of the Schmidt type according to the present invention is characterized by its off-axis optical system in which the center of the imaging plane 3 is positioned apart from the optical axes 5 of the main mirror 2 and the aspherical reflecting correction plate 1, that is, the rotation center axes in the planar shape though the optical axes 5 lie on the same straight line. This means that the rotation center axes are not the center of the effective use areas of the main mirror 2 and the aspherical correction plate 1.

In this embodiment, the main mirror 2 and the aspherical reflecting correction plate 1 are produced by grinding reflecting mirrors rotationally symmetrical about the optical axes 5 and then cutting off the necessary portions, thereby simplifying the design and production thereof. Furthermore, it is possible to avoid the intrusion of the imaging plane into the effective ray bundle.

Figure 4:
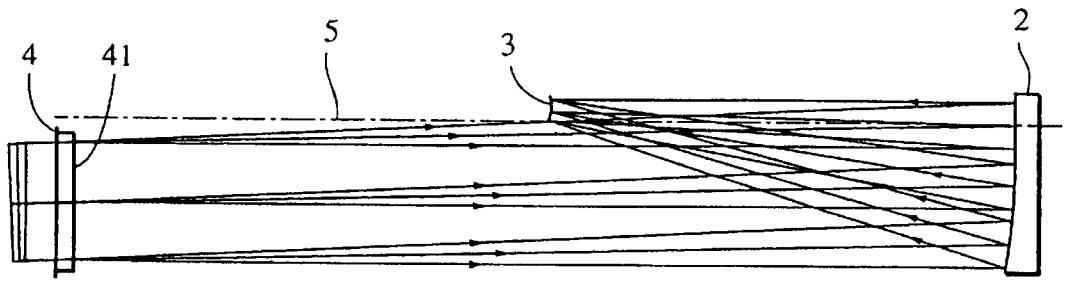
FIG. 4 is a schematic view showing the principal part of an optical system according to a second embodiment of the present invention.

FIG. 4 is a schematic view showing the principal part of an optical system according to a second embodiment of the present invention.

This embodiment has the same arrangement as that of the above embodiment shown in FIG. 1 except that an aspherical transmission correction plate 41 is used instead of the aspherical reflecting correction plate 1.

In FIG. 4, the same components as those in FIG. 1 are denoted by the same numerals.

In this embodiment, a ray bundle from an object (not shown) is reflected and concentrated by a main mirror 2 through an aperture stop 4, disposed near the center of curvature of the main mirror 2, and the aspherical transmission correction plate 41, and an image of the object is formed on an imaging plane 3 curved in the spherical shape and located out of an effective ray bundle.

Zinc sulfide (ZnS) having a high transmittance in a wide wavelength range is used as a material of the aspherical transmission correction plate 41 in this embodiment. Since high-purity ZnS for optics has high transmittance in a wide wavelength range from visible wavelength of approximately 0.4 μm to heat infrared wavelength of approximately 13 μm, it is suitable as an optical material for a correction plate.

In use of the aspherical transmission correction plate, chromatic spherical aberration increases as the ray height increases. In order to avoid that, the angle which an incident ray forms with the optical axis of the aspherical transmission correction plate 41 is made small and a portion near the optical axis is used in this embodiment.

Furthermore, chromatic aberration of the ray passing a portion apart from the optical axis of the aspherical transmission correction plate 41 is reduced by giving the aspherical transmission correction plate 41 a small curvature.

In this embodiment, if the chromatic aberration is required to be further reduced, achromatism may be produced by making the aspherical transmission correction plate from two kinds of optical materials, or the color aberration may be corrected by making one side of the aspherical transmission correction plate a diffraction optical plane (e.g. phase hologram).

Examples of numerical values in the first and second embodiments of the present invention are as follows. FIGS. 3 and 5 are lateral aberration views of the embodiments.

In the examples of numerical values, Ri denotes the radius of curvature of the i-th optical component from the object in traveling order of the ray bundle, Di denotes the i-th surface separation, f denotes the focal length, F-NO denotes the effective F-number, θ denotes the angle between the ray in the center of the ray bundle and the optical axis, and ω denotes the half field angle of the off-axial ray. A, B, C, D and E respectively denote the aspherical coefficients of second, fourth, sixth, eighth and tenth orders.

$$X = \frac{h^2 / R}{1 + [1 - (h/R)^2]^{1/2}} + Ah^2 + Bh^4 + Ch^6 + Dh^8 + Eh^{10}$$

where h denotes the height from the optical axis and R denotes the radius of curvature of the paraxial plane.

Numeric values of Embodiment 1 f=330 mm, F-NO=2.0, θ=10.5°, ω=1.9°

|   | Ri | Di |   |
|---|---|---|---|
| 1 | — | 0.00 | aperture stop |
| 2 | ∞ (aspherical surface) | −631.46 | aspherical correction plate |
| 3 | 660.000 | 330.00 | main mirror |
| 4 | 332.448 | — | imaging plane |

Asphere coefficients of aspherical correction plate

A=0, B=4.83352×10⁻¹⁰, C=6.91595×10⁻¹⁶,

D=4.79209×10⁻²¹, E=1.79065×10⁻²⁵

Numeric values of Embodiment 2 f=332.49 mm, F-NO=4.0, θ=1.4°, ω=1.4°

|   | Ri | Di |   |
|---|---|---|---|
| 1 | — | 0.00 | aperture stop |
| 2 | ∞ | 12.46 | aspherical |
| 3 | −60218.2 (aspherical) | 660.00 | correction plate |
| 4 | −660.000 | −332.49 | main mirror |
| 5 | −329.863 | — | imaging plane |

Asphere coefficients of aspherical correction plate

A=0, B=6.43044×10⁻¹⁰, C=1.82634×10⁻¹⁶,

D=2.27614×10⁻²⁰, E=1.48048×10⁻²⁴

According to the present invention, it is possible to achieve a reflective optical system which can be used in a wide wavelength range from ultraviolet to infrared and has high optical performance all over a picture plane and in which an imaging plane does not block an effective ray bundle and off-axial optical performance is high.

Particularly, since the optical axes of a main mirror and an aspherical correction plate in the reflective optical system of the Schmidt type are positioned on the same straight line passing the center of the imaging plane, it is possible to locate the imaging plane out of the effective ray bundle and to obtain high optical performance for off-axial rays. Furthermore, since the main mirror and the aspherical correction plate are rotationally symmetrical, the design and production thereof are simplified.

What is claimed is:

1. A reflective optical system comprising, in traveling order of light:

a correction plate having an aspherical surface;

a concave reflecting mirror having a spherical surface for concentrating a ray bundle from said correction plate; and a photoconductive plane, wherein the optical axis of said correction plate and an optical axis of said concave reflecting mirror are located away from a center of said photoconductive plane, wherein said photoconductive plane is disposed at a location outside of the ray bundle between said correction plate and said concave reflecting mirror, and wherein the aspherical surface of said correction plate is rotationally symmetrical about the optical axis of said concave reflecting mirror.

2. A reflective optical system according to claim 1, wherein the optical axes of said correction plate and said concave reflecting mirror agree with each other.

3. A reflective optical system according to claim 1, wherein said correction plate reflects the light.

4. A reflective optical system according to claim 1, wherein said correction plate transmits the light through said correction plate to said concave reflecting mirror.

5. A reflective optical system according to claim 4, wherein said correction plate is made of zinc sulfide.

6. A reflective optical system for use with an imaging plane, said reflective optical system comprising, in traveling order of light:

a correction plate having an aspherical surface; and a reflecting mirror having a spherical surface for concentrating a ray bundle from said correction plate to form an image on an imaging plane, the imaging plane being disposed at a location outside of the ray bundle between said correction plate and said reflecting mirror, wherein the aspherical surface of said correction plate is rotationally symmetrical about the optical axis of said reflecting mirror.

7. A reflective optical system according to claim 6, wherein optical axes of said correction plate and said reflecting mirror agree with each other.

8. A reflective optical system according to claim 6, wherein said correction plate reflects the light.

9. A reflective optical system according to claim 6, wherein said correction plate transmits the light through said correction plate to said reflecting mirror.

10. A reflective optical system according to claim 6, wherein said correction plate is made of zinc sulfide.

* * * * *

UNITED STATES PATENT AND TRADEMARK OFFICE
CERTIFICATE OF CORRECTION

PATENT NO. : 5,907,442

DATED : May 25, 1999

INVENTOR(S) : Toru MATSUDA

Figure 3A:
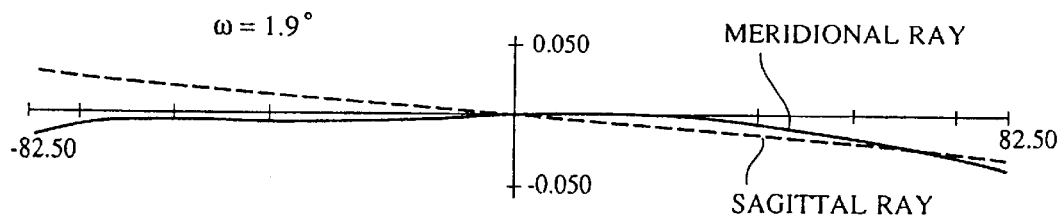
FIG. 3 is a view of aberrations in the first embodiment of the present invention.
Figure 3B:
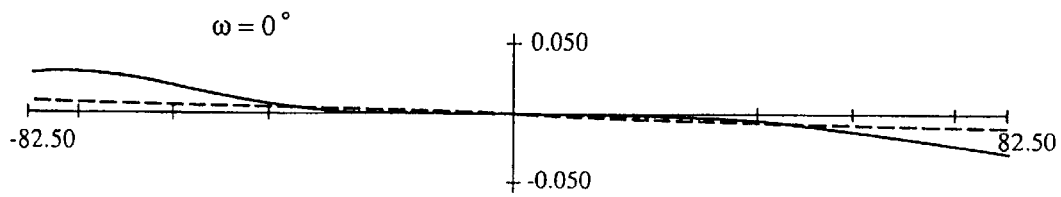
Figure 3C:
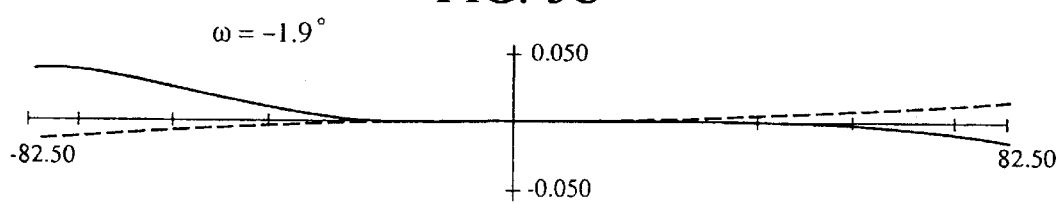
Figure 5A:
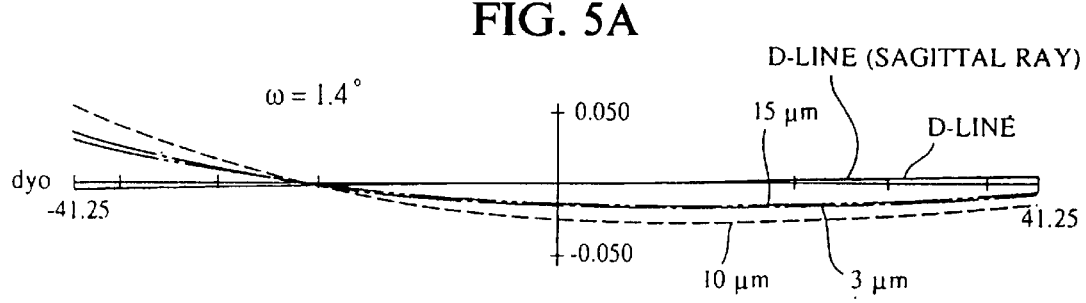
FIG. 5 is a view of aberrations in the second embodiment of the present invention.
Figure 5B:
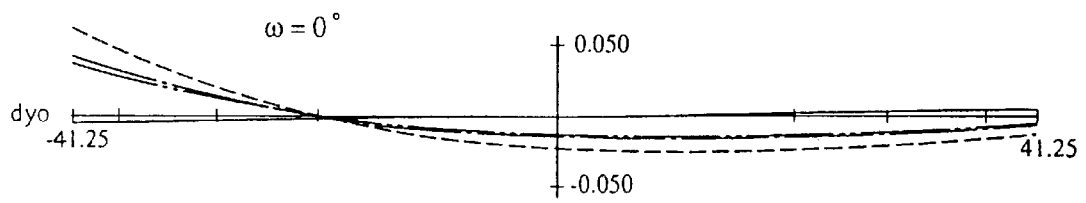
Figure 5C:
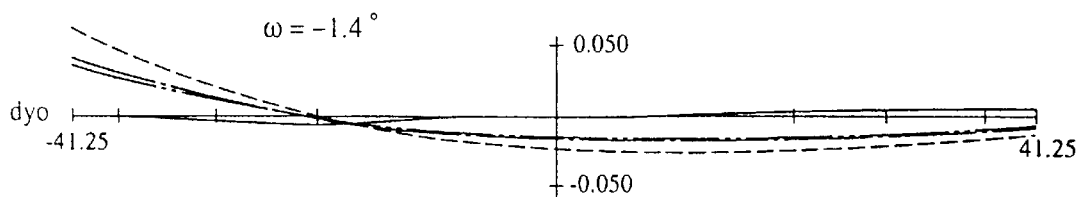
Figure 6:
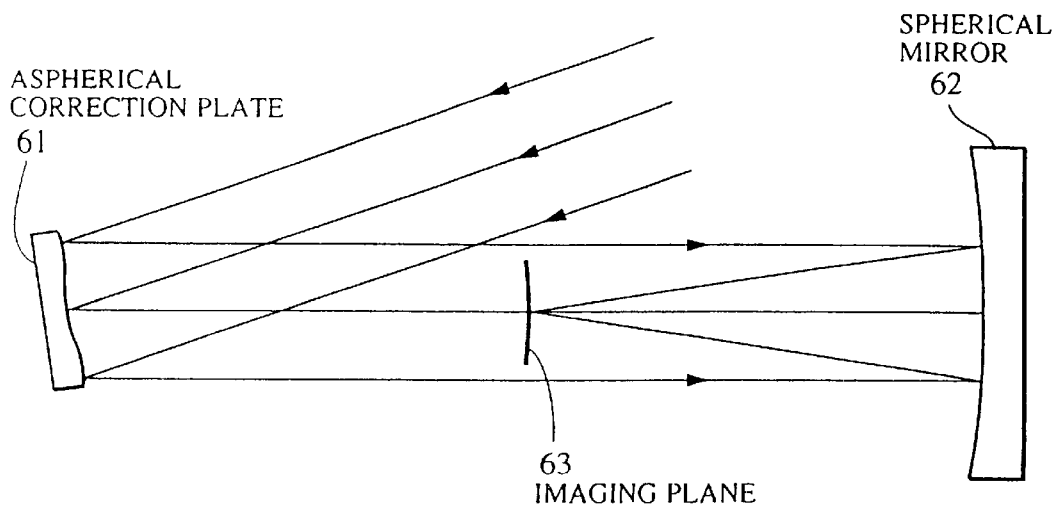
FIG. 6 is a schematic view of an optical system in a conventional Schmidt camera.

It is certified that error appears in the above-identified patent and that said Letters Patent is hereby corrected as shown below:

COLUMN 2:

Line 17, "tranmitting" should read --a transmitting--.
Line 25, "FIG. 3 is a view" should read
--Figs. 3A, 3B, and 3C are views--.
Line 31, "FIG. 5 is a view" should read
--Figs. 5A, 5B, and 5C are views--.

Signed and Sealed this

Seventh Day of November, 2000

Attest:

Q. TODD DICKINSON

*Attesting Officer*          *Director of Patents and Trademarks*